United States Patent
Gellis (10) Patent No.: US 9,346,202 B2
(45) Date of Patent: May 24, 2016

(54) UTILITY GLOVE

(75) Inventor: David Gellis, Stowe, VT (US)

(73) Assignee: MADGRIP HOLDINGS, LLC, Essex Junction, VT (US)

( * ) Notice: Subject to any disclaimer, the term of this patent is extended or adjusted under 35 U.S.C. 154(b) by 971 days.

(21) Appl. No.: 13/500,483

(22) PCT Filed: Oct. 11, 2010

(86) PCT No.: PCT/US2010/052168
§ 371 (c)(1),
(2), (4) Date: Jun. 25, 2012

(87) PCT Pub. No.: WO2011/046870
PCT Pub. Date: Apr. 21, 2011

(65) Prior Publication Data
US 2012/0266359 A1 Oct. 25, 2012

Related U.S. Application Data

(63) Continuation-in-part of application No. 12/577,273, filed on Oct. 12, 2009, which is a continuation-in-part of application No. 12/218,562, filed on Jul. 16, 2008, now abandoned.

(60) Provisional application No. 60/950,028, filed on Jul. 16, 2007.

(51) Int. Cl.
*B29C 45/14* (2006.01)
*A41D 19/04* (2006.01)
(Continued)

(52) U.S. Cl.
CPC ............ *B29C 45/14* (2013.01); *A41D 19/0065* (2013.01); *A41D 19/01558* (2013.01); *A41D 19/02* (2013.01)

(58) Field of Classification Search
CPC .................. B29C 45/14008; A41D 19/01505; A41D 19/01523; A41D 19/01558; A41D 19/0065
See application file for complete search history.

(56) References Cited

U.S. PATENT DOCUMENTS 1,664,542 A 4/1928 Douglass
1,725,065 A * 8/1929 Edwards ............ A41D 19/0065
2/168

(Continued)

FOREIGN PATENT DOCUMENTS

CA 2637973 1/2009
CL 200800807 A 3/2008

(Continued)

OTHER PUBLICATIONS

Vibram Five Finger Classic, http://www.vibramfivefingers.comm/products/images/102/large.jpg, viewed Jul. 2007.

(Continued)

*Primary Examiner* — Matthew Daniels
(74) *Attorney, Agent, or Firm* — Florek & Endres PLLC (57) ABSTRACT

A utility glove comprising a three dimensional molded portion formed of an elastomeric material molded onto a fabric material, wherein the molded portion has a thickness of from about 0.8 to about 10.8 mm with the elastomeric material including two or more areas of differing thicknesses within the range of from about 0.4 to about 10.0 mm. The molded portion of the utility glove has a concave palm, with the middle of the palm being set in from the edges to form a concave configuration.

The utility glove is manufactured by placing a glove blank comprising a fabric material over a first mold part in the form of at least a portion of a hand and bringing at least one second mold part into molding engagement with the first mold part to create a cavity with the glove blank on the first mold part. The elastomeric material is then injected into the cavity to form a molded portion, wherein the elastomeric material is injected on the side of the fabric material opposite the first mold part.

25 Claims, 8 Drawing Sheets

(51) Int. Cl.
  *A41D 19/00* (2006.01)
  *A41D 19/015* (2006.01)
  *A41D 19/02* (2006.01)

(56) References Cited

U.S. PATENT DOCUMENTS

| | | | |
|---|---|---|---|
| 1,979,130 A | 10/1934 | Wiley | |
| 2,120,722 A | 6/1938 | Tillotson | |
| 2,907,047 A | 10/1959 | Steinberg | |
| 2,913,729 A | 11/1959 | Wisenburg | |
| 3,035,291 A | 5/1962 | Bingham | |
| 3,324,220 A | 6/1967 | Stansfield | |
| 3,383,782 A | 5/1968 | McGinnity | |
| 3,663,679 A | 5/1972 | Barre et al. | |
| 3,735,511 A | 5/1973 | Gilbert et al. | |
| 3,869,726 A * | 3/1975 | Bell | 2/164 |
| 3,877,101 A | 4/1975 | Lewis | |
| 3,896,202 A | 7/1975 | Palau | |
| 3,921,313 A | 11/1975 | Mahide et al. | |
| 3,975,840 A | 8/1976 | Juzenko | |
| 4,021,860 A | 5/1977 | Swallow et al. | |
| 4,051,553 A | 10/1977 | Howard | |
| 4,094,014 A | 6/1978 | Schroeder | |
| D248,898 S | 8/1978 | DeLeone et al. | |
| 4,134,955 A | 1/1979 | Hanrahan, Jr. et al. | |
| 4,150,455 A | 4/1979 | Fukuoka | |
| 4,268,931 A | 5/1981 | Salomon | |
| 4,294,022 A | 10/1981 | Stockli et al. | |
| 4,295,238 A | 10/1981 | Clark | |
| 4,359,783 A | 11/1982 | Andrews | |
| 4,371,988 A | 2/1983 | Berend | |
| D273,054 S | 3/1984 | Brinson, Jr. | |
| 4,447,967 A | 5/1984 | Zaino | |
| 4,453,904 A * | 6/1984 | Koliwer | B29C 33/12 12/128 C |
| 4,785,479 A | 11/1988 | Watanabe | |
| D321,426 S | 11/1991 | Brinker | |
| 5,092,347 A | 3/1992 | Shaffer et al. | |
| 5,119,512 A * | 6/1992 | Dunbar et al. | 2/167 |
| D328,369 S | 7/1992 | Hong | |
| D372,112 S | 7/1996 | Garneau | |
| 5,598,582 A | 2/1997 | Andrews | |
| 5,617,585 A | 4/1997 | Fons et al. | |
| 5,640,714 A | 6/1997 | Tanaka | |
| 5,675,839 A | 10/1997 | Gordon et al. | |
| 6,044,493 A | 4/2000 | Post | |
| 6,065,155 A | 5/2000 | Sandusky | |
| 6,081,928 A * | 7/2000 | Bourne | A41D 19/0055 2/161.6 |
| 6,128,778 A | 10/2000 | Castagneri | |
| 6,185,747 B1 | 2/2001 | Hughes | |
| 6,415,446 B1 | 7/2002 | McLean et al. | |
| D462,824 S | 9/2002 | Jones, Sr. | |
| D468,074 S | 1/2003 | Votel | |
| 6,526,593 B2 | 3/2003 | Sajovic | |
| 6,578,205 B1 | 6/2003 | King | |
| 6,618,860 B1 | 9/2003 | Sullivan et al. | |
| 6,675,392 B2 | 1/2004 | Albert | |
| 6,704,939 B2 | 3/2004 | Faulconer | |
| 6,845,519 B2 | 1/2005 | Garneau | |
| 6,889,389 B2 | 5/2005 | Kleinert | |
| 6,928,658 B2 | 8/2005 | Taira et al. | |
| 6,943,130 B2 | 9/2005 | Gabbrielli | |
| D514,771 S | 2/2006 | Jaeger | |
| D514,772 S | 2/2006 | Bevier | |
| D515,782 S | 2/2006 | Mattesky | |
| 7,100,212 B2 | 9/2006 | Jaeger | |
| D536,837 S | 2/2007 | Jaeger | |
| 7,287,285 B2 | 10/2007 | Jaeger | |
| 7,310,826 B2 | 12/2007 | Kishihara | |
| D558,952 S | 1/2008 | Ash et al. | |
| D579,181 S | 10/2008 | Swanson et al. | |
| D581,102 S | 11/2008 | Faulconer | |
| D582,134 S | 12/2008 | Von Conta et al. | |
| D584,026 S | 1/2009 | Kleinert | |
| 7,475,433 B2 | 1/2009 | Coulter et al. | |
| D586,982 S | 2/2009 | Fliri | |
| D589,679 S | 4/2009 | Rolfe | |
| D608,978 S | 2/2010 | Votel | |
| D618,882 S | 7/2010 | Jaeger | |
| D621,552 S | 8/2010 | Fitzgerald et al. | |
| D625,051 S | 10/2010 | Fitzgerald et al. | |
| 7,805,860 B2 | 10/2010 | Fliri | |
| D630,005 S | 1/2011 | Fliri | |
| 2001/0044950 A1 * | 11/2001 | Sajovic | 2/161.8 |
| 2002/0010957 A1 | 1/2002 | Katz | |
| 2003/0126666 A1 * | 7/2003 | McNamara | 2/16 |
| 2004/0025226 A1 | 2/2004 | Jaeger | |
| 2004/0025227 A1 | 2/2004 | Jaeger | |
| 2005/0160516 A1 | 7/2005 | Price | |
| 2005/0268374 A1 * | 12/2005 | Mattesky | 2/164 |
| 2006/0143767 A1 | 7/2006 | Yang et al. | |
| 2007/0144039 A1 | 6/2007 | Fliri | |
| 2007/0204381 A1 | 9/2007 | Thompson et al. | |
| 2008/0060111 A1 | 3/2008 | Baacke et al. | |
| 2008/0110291 A1 | 5/2008 | Vitek | |
| 2008/0201823 A1 | 8/2008 | Jaeger | |
| 2009/0038052 A1 * | 2/2009 | Gellis | 2/161.8 |
| 2009/0139007 A1 | 6/2009 | Bevier | |
| 2009/0144881 A1 | 6/2009 | Panosian et al. | |
| 2009/0320178 A1 | 12/2009 | Faulconer | |
| 2010/0024095 A1 | 2/2010 | Gellis | |
| 2010/0083420 A1 | 4/2010 | Bouckaert | |
| 2011/0030121 A1 | 2/2011 | Smalls | |
| 2011/0258879 A1 | 10/2011 | Dananberg et al. | |

FOREIGN PATENT DOCUMENTS

| | | |
|---|---|---|
| DE | 29615362 U1 | 1/1998 |
| JP | 58-005237 A | 1/1983 |
| JP | 2007084975 A | 4/2007 |
| JP | 3131685 U | 5/2007 |
| JP | 2008050745 A | 3/2008 |
| WO | WO 2007038487 | 4/2007 |

OTHER PUBLICATIONS

Copenheaver, Blaine R. "International Search Report and Written Opinion of the International Search Authority, or the Declaration for International Application No. PCT/US2010/052168," Dec. 2, 2010.

Baharlou, Simin, "International Preliminary Report on Patentability, and Written Opinion of the International Searching Authority for International Patent Application No. PCT/US2010/052168," Apr. 17, 2012.

* cited by examiner

UTILITY GLOVE

REFERENCE TO RELATED APPLICATIONS

This application is a continuation in part of U.S. patent application Ser. No. 12/577,273 filed on Oct. 12, 2009, which is a continuation in part of U.S. patent application Ser. No. 12/218,562 filed on Jul. 16, 2008, which claims priority to U.S. Provisional Patent Application No. 60/950,028 filed on Jul. 16, 2007. Each is incorporated by reference in its entirety.

FIELD OF THE INVENTION

The present invention relates to the field of utility gloves, for work, sports and athletics, gardening and the like and, more particularly, to utility gloves having elastomeric reinforcements for improved protection of the wearers' hands.

BACKGROUND OF THE INVENTION

Utility gloves are used in areas such as gardening, construction or general work at a job site, production or garden facility, sports or athletics or simply working or playing around one's home. These gloves usually contain a gripping portion that prevents items from slipping out of the user's hand, prevent injury to the user's skin such as cuts, scrapes and blisters, and provide a better grip when turning or grabbing objects. The gripping portion of the glove is usually applied to a knit nylon glove by dipping the nylon glove into an elastomeric material, such as natural or synthetic rubber, to apply an elastomeric gripping surface to the glove. This process increases the density of the glove and maintains a fabric portion which tends to absorb moisture and dirt and is hard to clean.

The purpose of the present invention is to create a utility glove with a seamless reinforcement in one or more zones most subject to abrasion. In addition to minimizing the seams, additional material or padding is provided in areas most subject to abrasion and/or impact, and this padding is preferably included without seams as well. In this regard, depending on the end usage envisioned, it is possible to adjust the amount of elastomeric material, including a natural or synthetic rubber, used in strategic areas to protect against impact and abrasion. Ultimately, the use of such padding provides the end user with a longer lasting, more comfortable glove. Additionally, the present invention includes the ability to provide different textures in the elastomeric material at strategic areas, to further provide one or more enhanced gripping surfaces.

SUMMARY OF THE INVENTION

It is therefore an object of the invention is to create a utility glove that is an improvement over typical dipped nylon knit utility gloves. Another object of the invention is to provide additional durability and an ability to have varying palm thicknesses without having to increase the density of the knit utility glove.

A further object of the invention is to remove the reliance on fabric absorption of the elastomeric material to create density.

A still further object of the invention is to provide utility gloves with strategically placed padding and/or abrasion resistance zones as well as enhanced grip zones.

Yet a further object of the invention is to provide palm construction including an elastomeric material optionally without a knit backing, which typically absorbs excessive amounts of moisture and dirt. This allows for easier cleaning of the glove by simply being able to clean it off with a damp cloth as opposed to being laundered.

Another object of the invention is to create the maximum protection against abrasion in what typically are areas that require reinforcement, i.e., the index finger and thumb, as well as possibly the area between the index finger and thumb and the area directly below the base and crotch of each finger.

Still a further object of the invention is to provide abrasion and impact protection by raising the elastomeric material in the areas that are most likely to be subject to abrasion and impact, namely, the base of the thumb and the area of the palm directly below the fingers.

Another object of the invention is to create a molded component that can be altered to have varying elastomeric materials in different areas to provide for improved characteristics of the glove, and most particularly grip and flexibility. For example, softer elastomeric materials can be used for flexibility in areas less prone to wear and stronger, textured elastomeric materials can be used on in areas related to grip.

A further objective of the invention is to create a more natural feeling molded glove having a pre-curved concave palm portion, where the middle of the palm portion is set in from the edges of the palm portion to create an at least partially cupped shape, to minimize bunching when the wearer's hand closes. This pre-curved palm portion may also continue or extend to the fingers for a more natural shape of the hand at rest.

Still other objects and advantages of the invention will, in part, be obvious and/or apparent from the specification without deviating from the spirit and scope of the invention.

These and other objects are obtained through the utility glove of the present invention having a palm side including a three dimensional molded portion formed of an elastomeric material molded onto a fabric material where the molded portion includes two or more areas of differing thickness. The molded palm portion may have one or more of thickened areas for abrasion resistance, padded areas for comfort, flex grooves including thinned areas for improved movement, and textured grip areas for improved grip. The molded palm portion may be formed of different elastomeric materials to take advantage of the different characteristics of the particular materials.

It is also contemplated that the back side of the glove includes a molded portion, so as to form a guard over the user's knuckles or back of the hand that may be vulnerable to injury in some uses. The molded back may be independent from or formed integrally with the molded front side of the glove, and may be formed so that the molded portion extends up to and including 360° about the wearer's hand, preferably without a seam.

A molded portion of a utility glove may be formed by placing a piece of heat resistant fabric against a first mold part formed in the shape of at least a portion of a hand, bringing a corresponding second or additional mold part(s) into molding relation with the first mold part and injecting an elastomeric material into the mold cavity between the mold parts on the side of the fabric material opposite the first mold part to form the molded portion. When calling for a first mold part in the shape of at least a portion of the hand, it is meant that the mold part is formed in the three dimensional shape of at least a portion of the hand.

It is anticipated that the first mold part in the shape of at least a portion of the hand is formed in different sizes, relative to the glove sizes of the potential users, and that the corresponding second and/or additional mold part or parts include one or more of one or more textured areas, one or more thickened areas, one or more padded areas and one or more flex grooves. Preferably, the heat resistant fabric used in the mold is a knit hydrophilic material to improve absorbance of the elastomeric material.

Most preferably, the fabric placed on the mold in the shape of at least a portion of the hand is in the form of a glove that is placed over the first mold part in the three dimensional shape of at least a portion of the hand. This contemplates that the fabric corresponds to at least a portion of a glove, such that the fabric is not a swatch of fabric but rather comprises at least a portion with two layers of fabric when placed flat. When the fabric in the form of a glove is placed on the first mold part, the first mold part is inserted into an opening in the fabric formed as at least a portion of a glove with at least one layer on each side of at least a portion of the first mold part.

The elastomeric material used to form at least a portion of the three dimensional molded portion is preferably a relatively soft thermoplastic rubber material, with a durometer of from about 10-25 and most preferably a durometer of about 15. When injection molded into a mold cavity in which the fabric resides, the elastomeric material is absorbed into the porous structure of the fabric.

It is also preferred that the thickness of the elastomeric material be controlled, with the thickness of the elastomeric material on the fabric being between from about 0.5 to about 3.0 mm. In this regard, it is preferred that the thickness in the areas intending to flex, i.e., at joints in the fingers and folds in the palm, be thinned or reduced relative to adjacent areas to create flexibility, even when areas prone to abrasion or in need of cushioning are thicker. The use of such a thin layer of elastomeric material is capable of use only due to the absorption of the elastomeric material into the porous fabric, which maintains the physical integrity of the thin elastomeric material.

Of course, other steps can be employed to create a finished glove, based on the manufacturer's design preference. For example, known process steps such as dipping a glove in a material to provide certain attributes may be used either before or after the molded palm portion is bonded to the fabric material.

BRIEF DESCRIPTION OF THE DRAWINGS

The present invention will be better understood when considered in view of the attached drawings, in which like reference characters indicate like parts. The drawings, however, are presented merely to illustrate the preferred embodiment of the invention without limiting the invention in any manner whatsoever.

DETAILED DESCRIPTION OF THE PREFERRED EMBODIMENTS

Figure 1:
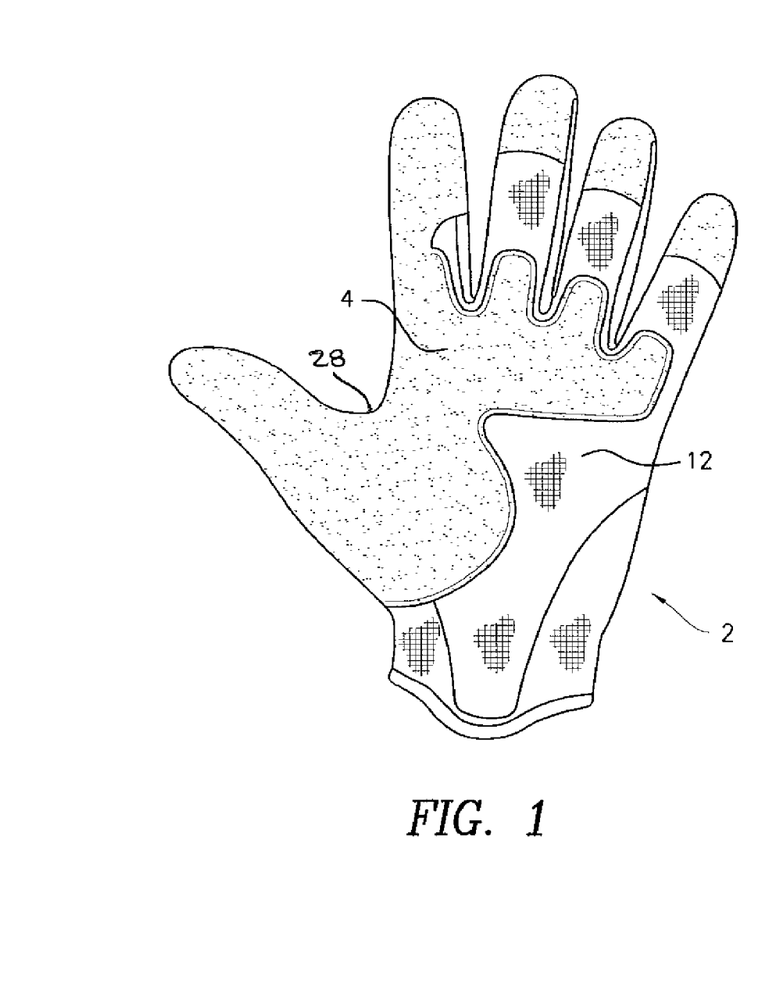
FIG. 1 shows a front view, palm side, of a utility glove according to the invention.

FIG. 1 shows the palm side of a utility glove 2 with a molded portion 4 formed of an elastomeric material bonded to a fabric material. The palm side of the utility glove 2 shown in FIG. 1 also includes a fabric material 12 in the area beyond the molded portion 4, although such a fabric material 12 is not required as a visible element of the palm side of the glove 2 of the present invention. Notwithstanding, it is preferred that the fabric material 12 beyond the molded portion 4 is the continuation of the fabric material forming the adjacent molded portion 4.

Figure 2:
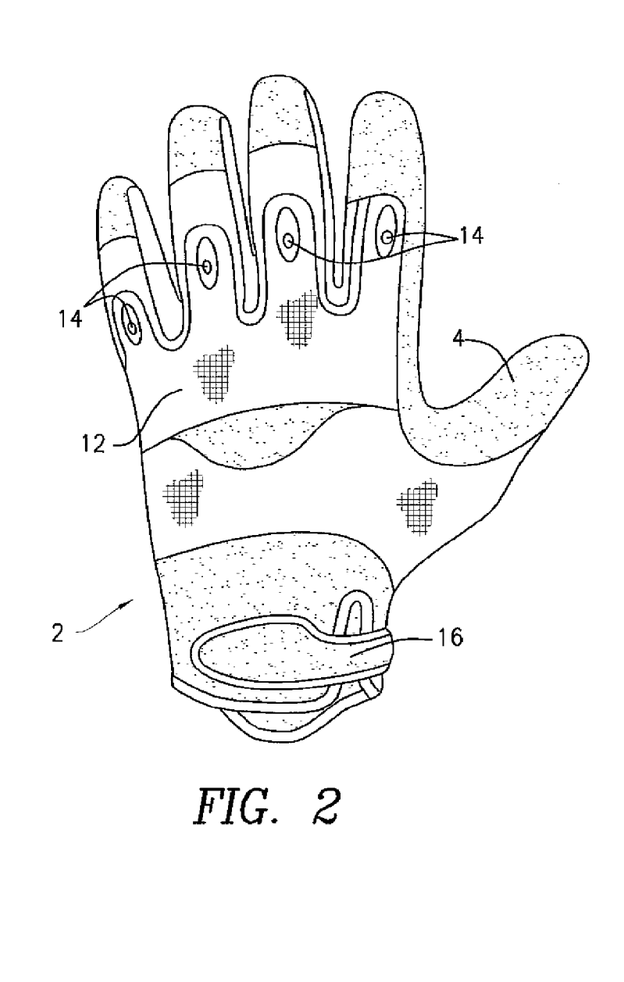
FIG. 2 shows a back view of the glove of FIG. 1.

FIG. 2 shows the back side of the glove 2, including a fabric material 12 and having independent molded areas 14 applied with raised perforated protective shapes. Of course, any molded portion can be formed on the back side of the glove 2, including a molded portion 4 or 14 that covers the knuckles where the fingers join the back of the hand or even the back of the hand itself. The fabric material 12 on the back side of the glove 2 is preferably formed as part of a glove blank including the fabric material 12 on the palm side of the glove. Alternatively, the fabric 12 on the back side of the glove 2 may be sewn to the palm side of the glove 2, either to the molded palm portion 4 or the fabric material 12 of the palm side. A closure element, shown as a molded wrist strap 16, may be provided to afford a better fit and help keep the glove 2 securely on the user's hand while in use.

Figure 3:
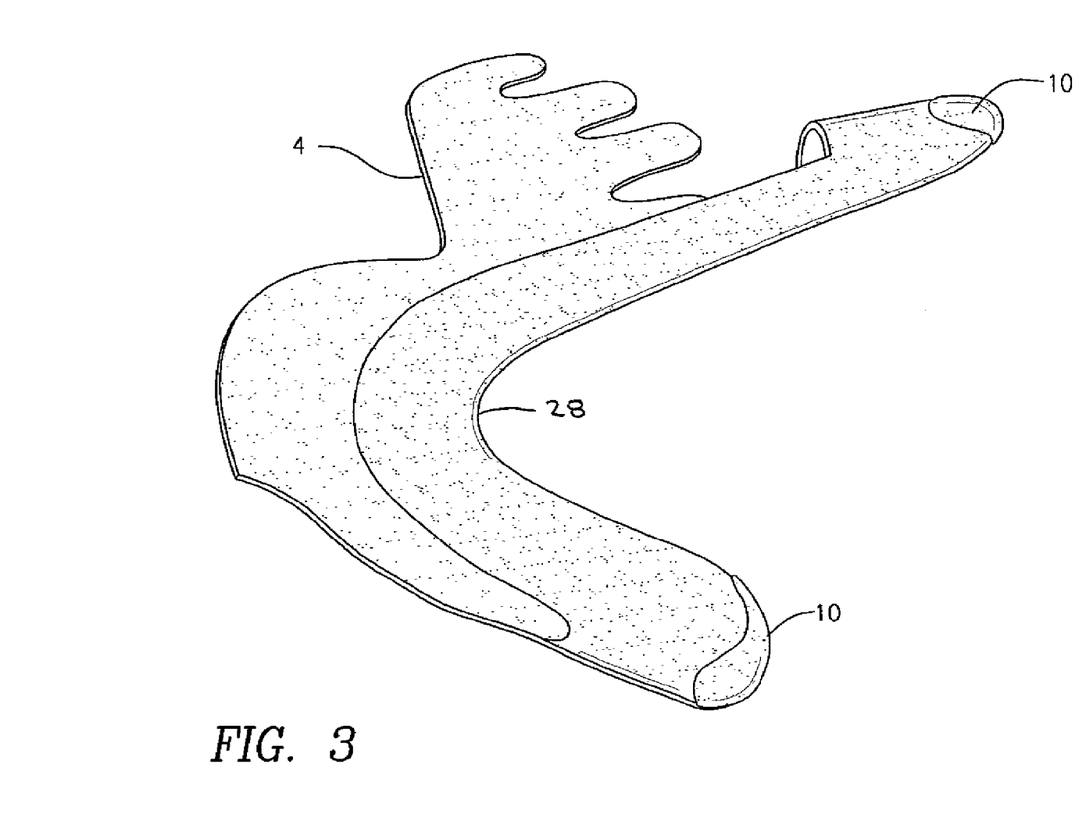
FIG. 3 shows the back of the palm side gripping portion of the glove of FIG. 1.
Figure 4:
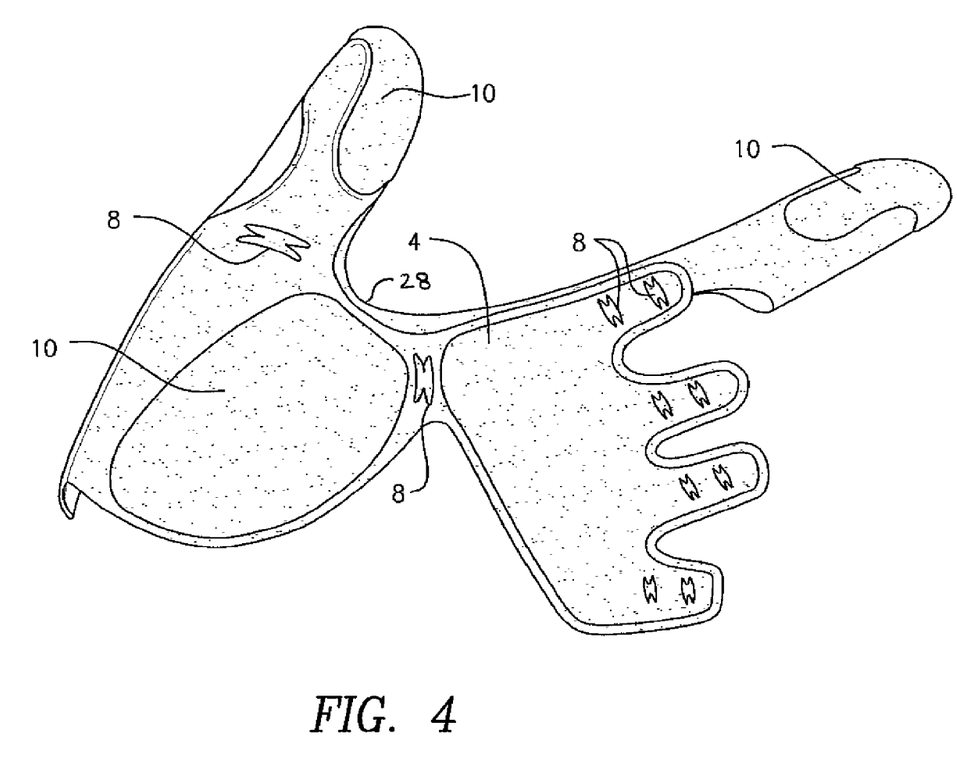
FIG. 4 shows the palm side of the palm gripping portion of the glove of FIG. 1 with embossed grip details.
Figure 5:
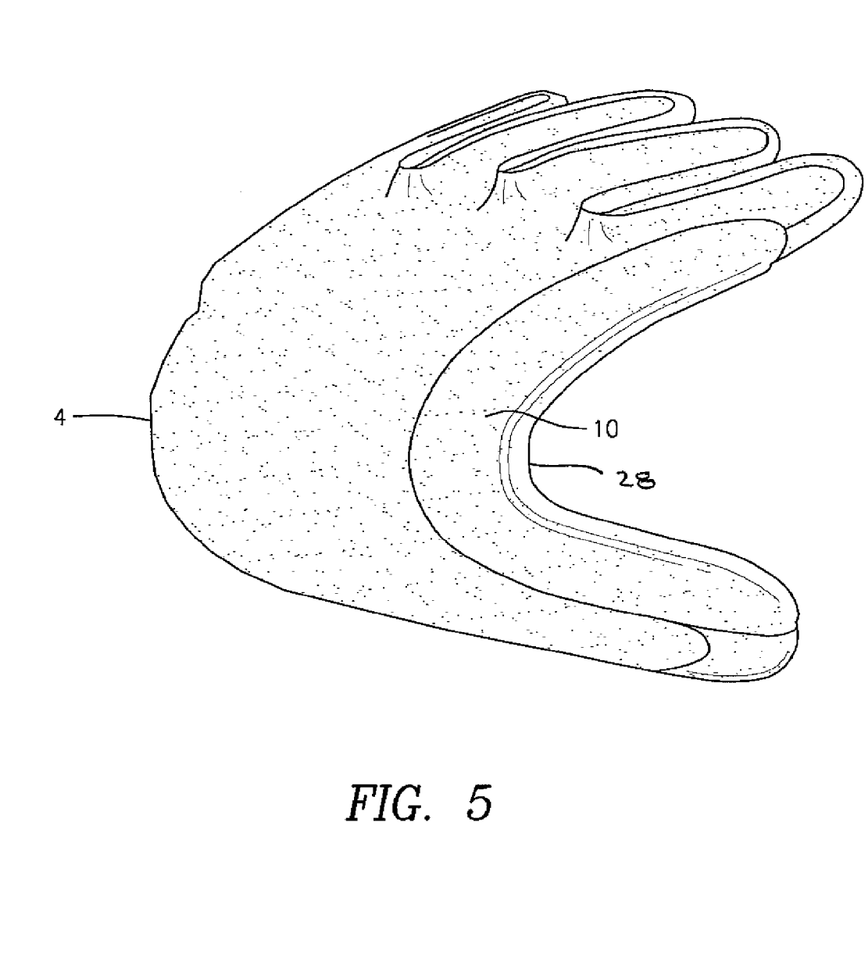
FIG. 5 shows the inside of the palm gripping portion of the gardening glove embodiment.
Figure 6:
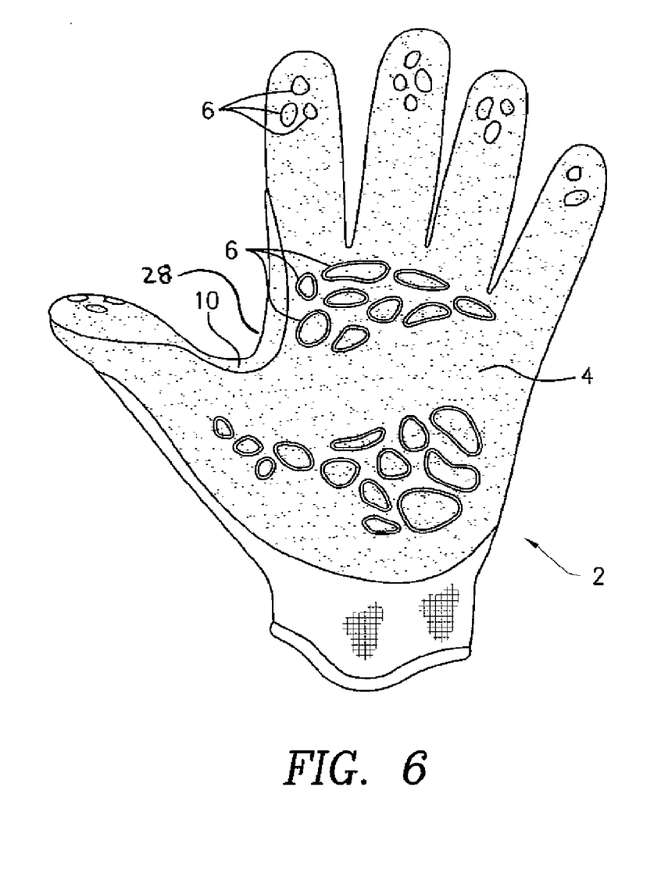
FIG. 6 shows the palm side of the gardening glove with the gripping portions of FIG. 5.
Figure 7:
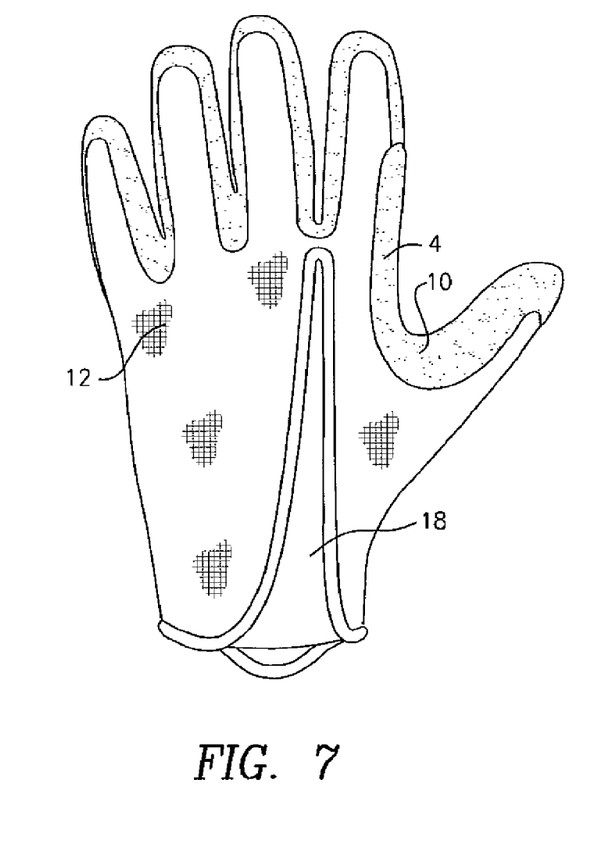
FIG. 7 shows the back side of the glove of FIG. 6.
Figure 8:
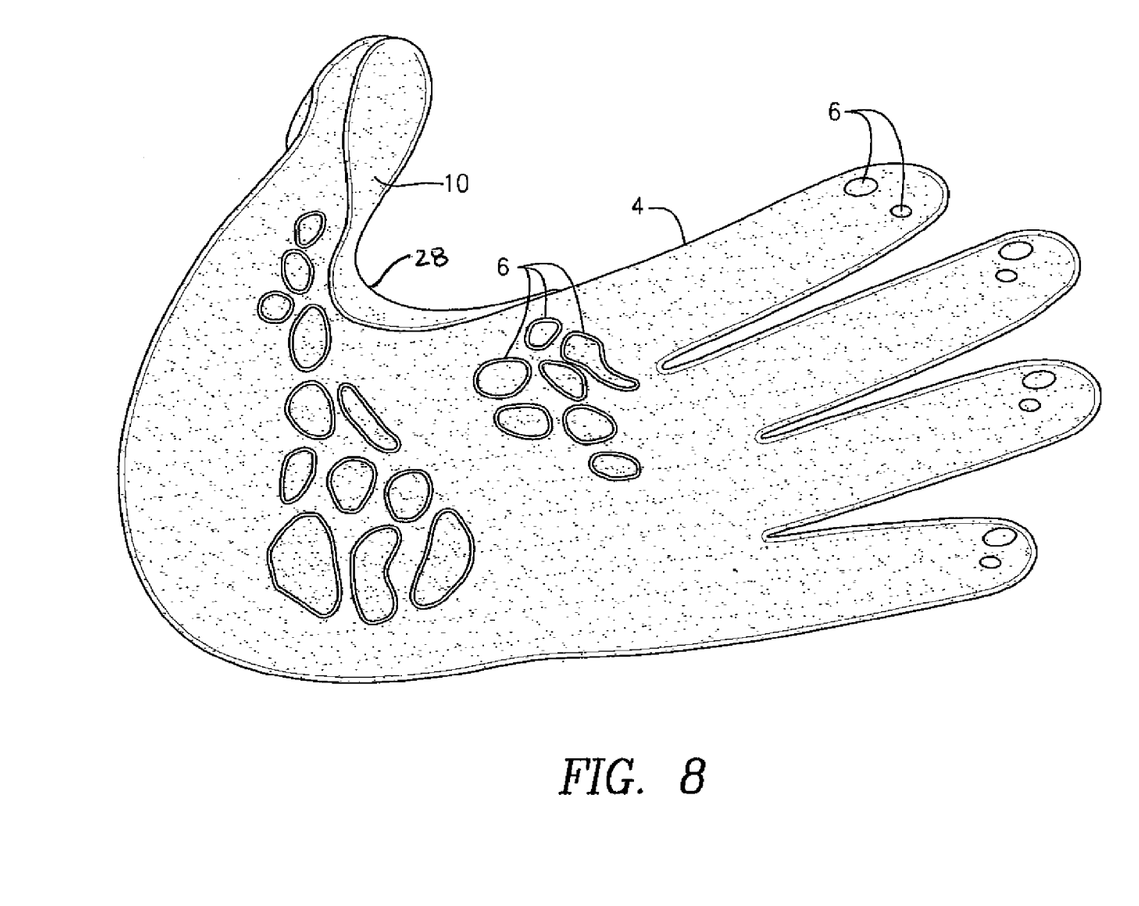
FIG. 8 shows the palm side of the palm gripping portion of FIG. 5.
Figure 9:
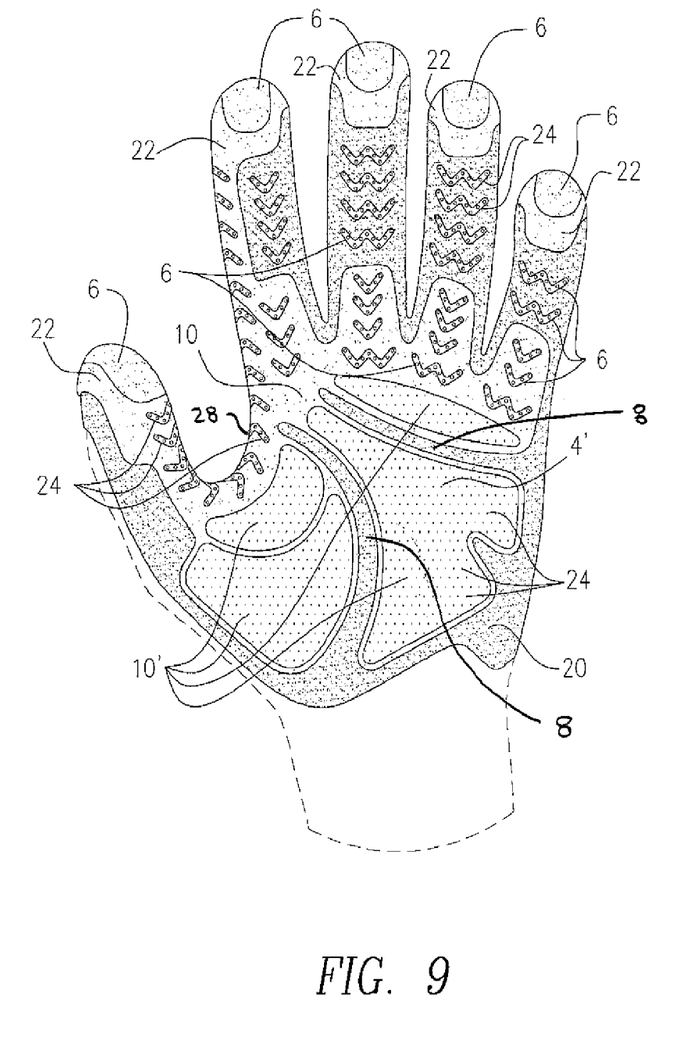
FIG. 9 shows a front view, palm side, of a preferred embodiment of a utility glove according to the invention.
Figure 10:
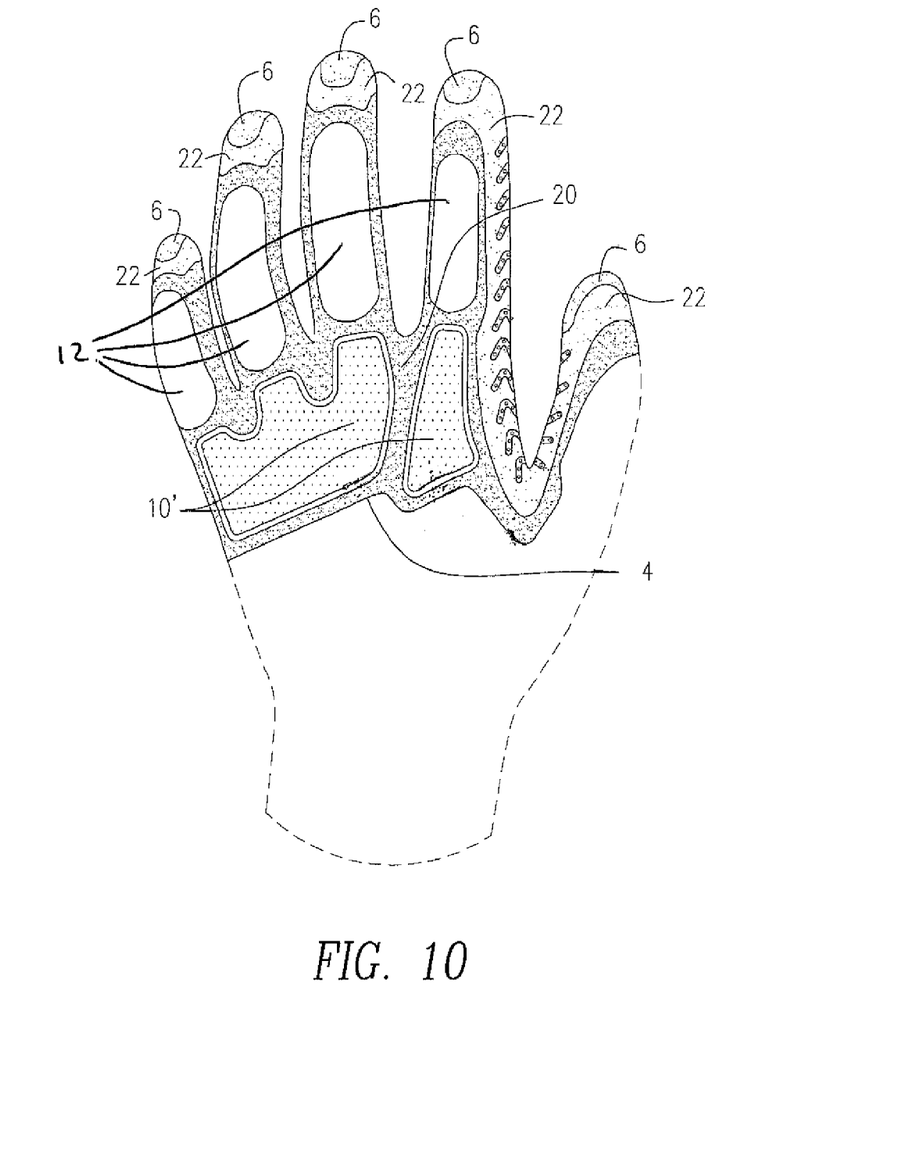
FIG. 10 shows a back view of the glove of FIG. 9.

The molded portion 4 of the glove 2 of the present invention preferably has embossed gripping details 6, as shown in FIGS. 6, 8 and 9, debossed flex grooves 8, shown in FIGS. 4 and 9, and raised textured grip areas 10, shown in FIGS. 4, 6 and 10. In this regard, the molded portion 4 of the embodiment of FIGS. 3-10 preferably includes raised textured grip areas 10 shown as a raised or thickened textured index finger tip and thumb tip for better gripping, durability and reinforcement.

The molded portion 4 of the glove 2, or any molded portion 4 and/or 14 of the glove 2, is preferably manufactured by using a heat resistant knit hydrophilic fabric that can withstand heat of approximately 400 degrees Fahrenheit onto which an elastomeric material is injection molded. Preferably, a mold that comprises a first mold part in the shape of at least a portion of a hand and at least one corresponding second mold part create a mold cavity with the fabric therein. Although any suitable knit hydrophilic heat resistant fabric can be used for the fabric, it has been found that fabric material comprising a nylon material is the most suitable for the invention as presently contemplated. Such a nylon knit hydrophilic material comprises a porous structure for the elastomeric material to bond with the fabric 12 by penetrating and being drawn into the "pores" of the fabric 12.

As set out above, a mold part in the shape of at least a portion of a hand may be in the three dimensional shape of at least a portion of a hand, not merely a two dimensional silhouette of a portion of a hand. The heat resistant fabric 12 is preferably in the form of a glove blank, i.e., at least a portion of a glove structure which can receive at least a portion of a hand. Alternatively, albeit less preferred, the heat resistant fabric 12 can be cut in the shape of the outlined elastomeric material that forms the molded portion 4 of the glove 2, as shown in FIGS. 3-4 and/or FIGS. 5 and 8, that is sewn to a fabric material 12, illustrating an alternative embodiment of the molded portion 4.

The utility glove 2 of the present invention, however, is most preferably manufactured by placing a glove blank comprising a fabric material 12 over a first mold part in the form of at least a portion of a hand and bringing at least one second mold part into molding engagement with the first mold part to create a cavity with the glove blank on the first mold part. The elastomeric material is then injected into the cavity to form a molded portion 4, wherein the elastomeric material is injected on the side of the fabric material 12 opposite the first mold part. Once the molded portion 4 is formed, the second mold part is disengaged from the first mold part and the fully formed utility glove 2 is removed from the first mold part.

With respect to the embossed gripping details 6, debossed flex grooves 8, and raised textured grip areas 10, as well as perforations 24, dimples, bumps and the like, it is preferred that the second mold part is adapted to form these elements in the molded portion 4.

In one of the most preferred embodiments, where the molded portion 4 extends up to and including 360° about the glove 2 without a seam, a second mold part and a third mold part may be brought into molding engagement with the first mold part to create a mold cavity, with a glove blank in the form of at least a portion of a glove on the first mold part. It is here contemplated that the second mold part is adapted to mold at least a portion of one of the palm side or the back side of the glove 2 and the third mold part is adapted to mold a portion of the other of the palm side or the back side of the glove 2.

The method of injection molding of the elastomeric material in the present invention permits the application of the elastomeric material on both sides of the glove 2, i.e., the palm side and the back side, while selectively leaving areas on the back of the glove 2 without an elastomeric material. This ensures breathability of the glove 2, where the open portions without an elastomeric material may have a mesh or other fabric in the opening for user comfort. Preferably, as shown in FIGS. 9 and 10, the elastomeric material of the molded portion 4 continues seamlessly around to the back of the glove 2, and most preferably seamlessly 360° around at least a portion of the glove 2.

For the three dimensional potion of the mold, namely the thumb and index finger in the embodiment of FIGS. 3 and 4 and each of the fingers in the embodiment of FIGS. 5 and 8-10, a stay can be inserted that ensures the fingers, including the index finger and thumb, to help keep their shape. However, the shaped molded portions of the glove 2, including the fingers and the palm of the molded portion 4 adapted to take a pre-curved concave configuration, are preferably formed by corresponding mold parts, where a first mold part is the three dimensional shape or form of at least part of a hand. When using the preferred corresponding mold parts, the elastomeric material is injected on the side of the fabric 12 opposite the first mold part in the shape of at least a portion of the hand to form the molded part or parts 4 and/or 14 of the glove 2.

In either event, the molded elastomeric material is intended to adhere to all areas of the fabric within the mold, preferably including the cap for covering the entire tip of the thumb and index finger or fingers, as well as the majority of the circumference of the thumb and fingers to be covered, that is at least, and preferably greater than, 50% of the circumference of the user's thumb and fingers, as desired.

Optionally, a thin lining material can be inserted between the fabric and the first mold part or as the fabric prior to shooting the elastomeric material, so that whatever portion that would be in contact with the palm, thumb and fingers of the user would be lined. The glove fabric 12 could then be stitched onto the contour of each finger and reinforcement area of the glove 2, if desired.

If the fabric in the molded palm portion 4 is not in the form of a glove blank which comprises the entire area of the glove 2, the molded portion 4 is then attached to the balance of the glove 2. Preferably, however, the fabric 12 that is visible on the back of the molded fingers, including the back of the thumb and the back of the index finger in FIGS. 1-4 and all fingers in FIGS. 5-8, is not stitched, but is a continuation of the fabric 12 bonded to the elastomeric material in the molding process.

In the embodiment of FIGS. 1-4, 9 and 10, the molded portion 4 is molded about the tip of the thumb and index finger, to form a cap over the tip of the thumb and index finger, and across the palm in the area below the fingers, including up onto a lower portion of the fingers adjacent the fourchettes for the purposes of creating as much of a waterproof construction as possible. The mold would also rise in between the index finger and the thumb, forming a saddle 28 from at least about the base of the thumb to at least about the base of the forefinger and extending from the palm side of the glove 2 to the back side of the glove 2 as part of the molded palm portion 4, for enhanced grip to enable the user to grip trowels, rakes, etc. more effectively. Flex grooves 8 are preferably placed in the areas of at least some of the joints of the hand on the molded palm portion 4, including in the palm area and at the fingers to provide improved flexibility. Raised portions 10, for abrasion resistance or padding, are included at the tips of the thumb and index finger as well as in the area of the saddle 28.

With respect to the elastomeric materials used, different compositions of elastomeric material can be used in the formation of the molded portion(s) 4 and/or 14 or parts thereof. For example, an elastomeric material that is less slippery when wet may be used at the tips of the thumb and one or more fingers, as well as the saddle 28, allowing the glove 2 to be more versatile in wet conditions. Moreover, if abrasion resistance is of particular importance in an area of the molded portion 4, a denser material can be used in that area. Similarly, where impact resistance is of particular importance in an area, such as a padded area 10, a less dense elastomeric material may be preferred. The proper applications of such variations will be well within the design preferences of one skilled in the art.

Notwithstanding, it has been found that thermoplastic vulcanite (TPV) and thermoplastic rubber (TPR) are preferred materials for forming and serving as the elastomeric material used for the molded portion(s) 4 and/or 14 of the glove 2 of the present invention. It has been found that the balance between durability and flexibility of the elastomeric material can be tilted toward flexibility when using the present invention. As such, an elastomeric material with a shore durometer of from about 15 to about 25, and most preferably about 15, can be used at very thin thicknesses when bonded to the fabric in areas where flexibility is more desirable than durability.

In the embodiments shown in FIGS. 5-10, molded portion 4 preferably covers at least, and preferably greater than, 50% of the circumference of the fingers including the entire palm side and the majority of the sides of the fingers. The palm portion 4' of the embodiment shown in FIGS. 9 and 10 is preferably pre-curved in a concave configuration to minimize bunching when the wearer's hand closes. The molded portion 4 also preferably contains embossed gripping details 6, such as textured loops, a gnarled surface, dimples bumps and/or the like, to increase gripping and enhance the protection of the user. The back portion of the glove 2 may include a closure element, shown in the form of a stretchable material 18 rather than a wrist strap 16, to provide a snug and comfortable fit while permitting easy insertion and removal of the wearer's hand.

Of course, the molded portion 4 of the glove 2 of FIGS. 5-10 is also amenable to molding with any variety of different patterns shapes and designs, including padded or raised portions 10, greater or lesser pre-curving of the palm portion 4' to create a predetermined cupped shape, flex grooves 8 or textured areas 6. The benefits of these features would similarly be the comfort, cosmetic value, waterproofing, which may be important for some uses such as gardening, as well as providing padding in critical impact areas, and additional grip and or abrasion resistance in critical areas of the glove 2.

The glove 2 of the present invention can be manufactured with different fabric and elastomeric materials, as described above. In addition to the different materials, the glove 2 of the present invention can have different thicknesses, both overall and in different areas of the molded portion.

More particularly, the fabric material used to form the glove of the present invention, preferably a knit hydrophilic fabric, can have any suitable thickness, but is preferably from about 0.4 to about 1.8 mm thick and most preferably about 0.5 to about 0.8 mm thick. Similarly, the elastomeric material can be molded onto the fabric material at any suitable thickness, however, it is preferred that the elastomeric material have a thickness of from about 0.4 to about 10.0 mm. In this regard, the upper limit of the elastomeric material can correspond to the appropriate use, including thicknesses of up to about 4.0, about 5.0, about 6.0 and about 10.0 mm for uses requiring such characteristics as electrical insulation to vibration damping, for use with everything from power drills to jackhammers. As such, the thickness of the molded portion, with the elastomeric material boded to the fabric material, would have a preferred thickness of from about 0.8 to about 10.8 mm.

Notwithstanding, for more common utility uses, it is preferred that the thickness of the elastomeric material in the molded portion 4 be from about 0.5 to about 3.0 mm thick, with from about 0.5 to about 1.7 being most preferred. Using these thicknesses, the overall thickness of the preferred glove 2 in the molded portion 4, including the elastomeric material bonded to the fabric material, is from about 0.8 to about 3.1 mm thick and most preferably from about 1.0 to about 2.3 mm thick.

In the preferred embodiment of FIGS. 9 and 10, the molded pre-curved palm portion 4' continues to the fingers to form an overall cupped shape including the fingers, again to minimize bunching when the hand is closed. Also incorporated in this embodiment are raised portions 10 and flex grooves 8 having stepped thicknesses to maximize flexibility, wear and cushioning. Most preferably, the areas of the embodiment of FIG. 9 forming the molded first areas 20, shown as about and within the palm, between the fingertips and joint between the fingers and the palm, around the back of the glove and in the flex grooves 8, is formed of an elastomeric material that is from about 0.4 to about 1.0 mm, and preferably from about 0.5 to about 0.8 mm. Used with a fabric of about 0.5 to about 0.6 mm, the total thickness of the molded palm portion 4 in the molded first areas 20 is preferably from about 1.0 to about 1.6 mm. This provides maximum flexibility for the user in the molded first areas 20.

The molded second areas 22 of the embodiment of FIGS. 9 and 10, being at the fingertips, on the saddle 28, between the forefinger and thumb and/or across the area between the palm and the fingers, comprises an intermediate raised area 10. The molded second areas 22 are formed of an elastomeric material that is from about 1.2 to about 1.6 mm, and preferably about 1.4 mm. Used with a fabric of about 0.5 to about 0.6 mm, the total thickness of the molded portion 4 in the molded second areas 22 is preferably from about 1.7 to about 2.2 mm. This provides additional durability for wear and extra protection without sacrificing feel.

The molded third areas 24 of the embodiment of FIGS. 9 and 10, being within the palm and/or across the knuckles on the back of the glove 2, is comprised of an extra raised area 10'. The molded third areas 24 are formed of an elastomeric material that is from about 1.6 to about 2.0 mm, and preferably about 1.8 mm. Used with a fabric of about 0.5 to about 0.6 mm, the total thickness of the molded portion 4 in the molded third areas 24 is preferably from about 2.1 to about 2.6 mm. This provides maximum protection for the portions of the users hand most likely to receive traumatic impact.

Significantly, the present invention provides the heretofore unknown benefit of a glove with a molded palm portion 4 that can utilize a molded elastomeric material of down to about a 15 shore durometer at a thickness down to about 0.4 mm, and preferably about 0.5 mm, provided it is backed with a suitable fabric 12 used in the molding process. This advance in the formation and flexibility permits the use as a molded portion 4 of a glove, where the user requires excellent flexibility with good durability.

Most preferably, the embodiment of FIGS. 9 and 10 provides a glove 2 with an molded portion 4 that seamlessly extends up to and including 360° about the glove 2, preferably having openings to permit airflow and, therefore, breathability to the glove 2. For example, as shown in FIG. 10, the molded portion 4 surrounds open fabric portions 12 on the back of the glove 2 for breathability in the finger area. Such fabric portions without elastomeric material encompassed by molded portion 4 can likewise be incorporated into the palm area of the glove 2, as desired.

Of course, as described above, the elastomeric material that is used for the molded portion 4 in the various areas 20, 22 and 24 may have different physical characteristics. These include differences in density, tackiness, flexibility, etc.

Also as shown in FIGS. 9 and 10, the elastomeric portions of the glove 2 may include perforations 24 that extend thorough the elastomeric material. These perforations 24 not only provide ventilation between the interior and exterior of the glove 2, enhancing user comfort, but may provide a vacuum grip where a vacuum is created between the user's finger sealing off the perforation 24 at the interior of the glove 2 and the article to be held at the exterior of the glove 2.

Additionally, the molded portion 4 of the glove 2 of FIGS. 9 and 10 includes gripping details 6 in the form of a gnarled surface, dimples, bumps, "v" shaped members and/or "w" shaped members that displace moisture both horizontally and vertically to create improved grip in wet or slippery conditions. As shown in the drawings, but without limitation, the gripping details 6 may have dimples or perforations 24 thereon to further increase grip by the use of a vacuum effect, as described above.

For example, the glove 2 of the present invention preferably includes a molded portion 4 with raised textured grip areas 10 at the fingertips and thumb tip for use in gloves for sports and athletics. The raised areas 10 create additional grip and resistance to catch a ball and/or hold a racket, bat, rope, paddle, etc. Most preferably, the textured surface on the raised textured grip areas 10 of the fingertips and thumb tip further improve the grip and resistance.

Moreover, as will be apparent to those skilled in the art, the glove 2 of the present invention can be designed with different combinations of the components described above. For example, the glove 2 of FIGS. 1-2 could be fashioned with a stretchable material 18 rather than a wrist strap 16, or could include a molded portion 4 that covers the front and sides of all of the fingers. Similarly, although the illustrated embodiments include a molded portion 4 over only the index finger and thumb or all fingers and thumb, it is understood that any number or combination of thumb and fingers can be covered.

It will thus be seen that the objects set forth above, those made apparent from the preceding description, and certain changes in the above constructions may be made without departing from the spirit and scope of the invention, such that all matter contained in the above description or shown in the accompanying drawings shall be interpreted as illustrative, and not limiting. In this regard, and without limitation, the various features shown in the several embodiments described can be applied singularly or in any number of combinations without falling beyond the scope of the invention.

It is also to be understood that the following claims are intended to cover all of the generic and specific features of the invention herein described, and all statements of the scope of the invention which, as a matter of language, might be said to fall therebetween.

The invention claimed is:

1. A method of manufacturing a utility glove utility having a thumb and four fingers, said glove comprising a three dimensional molded portion, the molded portion comprising an elastomeric material bonded to a fabric material in a three dimensional configuration substantially conforming to three dimensional contours of at least a portion of a hand exclusive of any variations in thickness or features on the surface of the molded portion, comprising the steps of:
   a. placing a glove blank comprising a fabric material over a first mold part in the form of at least a portion of a hand;
   b. bringing at least a second mold part into molding engagement with the first mold part to create a cavity with the glove blank on the first mold part; and
   c. injecting an elastomeric material into the cavity to form the molded portion, wherein the elastomeric material is injected on the side of the fabric material opposite the first mold part, said molded portion comprising greater than 50% of the circumference of each of the fingers along the length of each finger while leaving an area of fabric without elastomeric material on each finger wherein the molded portion comprises a palm having a middle and edges, the palm edges comprising a heel, a front corresponding to knuckles of the fingers, a thumb side and an outer side, wherein the middle of the palm is set in from the heel, the front, the thumb side and the outer side of the palm to form a concave shape.

2. The method of claim 1 further comprising the steps of:
   d. disengaging the second mold part from the first mold part; and
   e. removing the fully formed utility glove from the first mold part.

3. The method of claim 1 wherein the second mold part includes elements for forming a molded portion with two or more adjacent elastomeric areas of differing thicknesses.

4. The method of claim 1 wherein the second mold part includes elements for forming a molded portion with one or more textured gripping portions taken from the group consisting of gnarled portions, dimples, bumps, w-shaped members, v-shaped members, textured loops, perforations and embossed gripping details.

5. The method of claim 1 wherein the molded portion covers greater than 50% of the circumference of each finger and the thumb of the glove but not 100% of each finger and the thumb.

6. The method of claim 1 wherein the molded portion includes a saddle between the thumb and a first finger that extends continuously from a palm side to a back side of the glove.

7. The method of claim 1 wherein the glove further comprises a main body portion, the molded portion comprising greater than 50% of the circumference of the thumb, each finger and the main body portion of the glove.

8. The method of claim 1 wherein the fabric material comprises a heat resistant knit hydrophilic fabric.

9. The method of claim 1 wherein the thumb and fingers have a distal end opposite an end where the thumb and fingers meet the main body portion of the glove, wherein the molded portion comprises a cap over an entire circumference of the distal end of the thumb and fingers.

10. The method of claim 9 wherein the elastomeric material of the molded portion on the portion of the length of the thumb and fingers is integrally formed continuously with the elastomeric material on the distal end of the thumb and fingers.

11. The method of claim 1 wherein the molded portion is formed to entirely surround one or more openings comprising an area of fabric without elastomeric material.

12. The method of claim 1 wherein the molded portion has different areas formed from different compositions of elastomeric materials.

13. The method of claim 1 wherein the fabric material of the glove blank extends from within the molded portion to beyond the molded portion of the glove.

14. A method of manufacturing a utility glove utility having a thumb and four fingers, said glove comprising a three dimensional molded portion, the molded portion comprising an elastomeric material bonded to a fabric material in a three dimensional configuration substantially conforming to three dimensional contours of at least a portion of a hand exclusive of any variations in thickness or features on the surface of the molded portion, comprising the steps of:
   a. placing a glove blank comprising a fabric material over a first mold part in the form of at least a portion of a hand;
   b. bringing at least a second mold part into molding engagement with the first mold part to create a cavity with the glove blank on the first mold part; and
   c. injecting an elastomeric material into the cavity to form the molded portion, wherein the elastomeric material is injected on the side of the fabric material opposite the first mold part, said molded portion comprising greater than 50% of the circumference of each of the fingers along the length of each finger while leaving an area of fabric without elastomeric material on each finger wherein the glove further comprises a main body portion and the molded portion is continuously and integrally formed to extend 360° about the main body portion of the glove.

15. The method of claim 14 wherein the molded portion is formed to entirely surround one or more openings comprising an area of fabric without elastomeric material.

16. The method of claim 14 further comprising the steps of:
   d. disengaging the second mold part from the first mold part; and
   e. removing the fully formed utility glove from the first mold part.

17. The method of claim 14 wherein the second mold part includes elements for forming a molded portion with two or more adjacent elastomeric areas of differing thicknesses.

18. The method of claim 14 wherein the molded portion has different areas formed from different compositions of elastomeric materials.

19. The method of claim 14 wherein the fabric material of the glove blank extends from within the molded portion to beyond the molded portion of the glove.

20. The method of claim 14 wherein the molded portion comprises greater than 50% of the circumference of the thumb and each finger of the glove.

21. The method of claim 14 wherein the molded portion covers greater than 50% of the circumference of each finger and the thumb of the glove but not 100% of each finger and the thumb.

22. The method of claim 14 wherein the molded portion includes a saddle between the thumb and a first finger that extends continuously from a palm side to a back side of the glove.

23. The method of claim 14 wherein the fabric material comprises a heat resistant knit hydrophilic fabric.

24. The method of claim 14 wherein the thumb and fingers have a distal end opposite an end where the thumb and fingers meet the main body portion of the glove, wherein the molded portion comprises a cap over an entire circumference of the distal end of the thumb and fingers.

25. The method of claim 24 wherein the elastomeric material of the molded portion on the portion of the length of the fingers is integrally formed continuously with the elastomeric material on the distal end of the thumb and fingers.

\* \* \* \* \*